United States Patent
Tseng et al.

(10) Patent No.: US 6,804,584 B2
(45) Date of Patent: Oct. 12, 2004

(54) METHOD FOR DETERMINING THE ROLL ANGLE OF A VEHICLE USING AN ESTIMATION OF ROAD BANK ANGLE

(75) Inventors: Hongtei Eric Tseng, Canton, MI (US); Davorin David Hrovat, Ann Arbor, MI (US); Michael G. Fodor, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 86 days.

(21) Appl. No.: 10/101,998

(22) Filed: Mar. 20, 2002

(65) Prior Publication Data

US 2003/0182025 A1 Sep. 25, 2003

(51) Int. Cl.$^7$ .............................................. G06F 19/00
(52) U.S. Cl. ........................................................ 701/1
(58) Field of Search .............................. 701/1, 36–39, 701/41, 45, 48, 65, 71–75, 79–80, 82, 91–93, 121, 124; 244/179, 184; 180/271, 280, 282, 286, 289

(56) References Cited

U.S. PATENT DOCUMENTS

| | | | |
|---|---|---|---|
| 4,788,773 A | 12/1988 | Palsgard et al. | |
| 5,200,896 A | 4/1993 | Sato et al. | |
| 5,446,658 A | 8/1995 | Pastor et al. | |
| 5,720,533 A | 2/1998 | Pastor et al. | |
| 5,723,782 A | 3/1998 | Bolles, Jr. | |
| 5,742,919 A | 4/1998 | Ashrafi et al. | |
| 6,038,495 A | 3/2000 | Schiffmann | |
| 6,038,496 A | 3/2000 | Dobler et al. | |
| 6,073,065 A | 6/2000 | Brown et al. | |
| 6,195,606 B1 | 2/2001 | Barta et al. | |
| 6,212,455 B1 | 4/2001 | Weaver | |
| 6,223,114 B1 | 4/2001 | Boros et al. | |
| 2003/0055549 A1 * | 3/2003 | Barta et al. | |

OTHER PUBLICATIONS

Fukada, Y.: "Estimation of Vehicle Slip–Angle With Combination Method Of Model Observer And Direct Integration" International Symposium on Advance Vehicle Control, Sep. 1998.

\* cited by examiner

*Primary Examiner*—Thu V. Nguyen
(74) *Attorney, Agent, or Firm*—Gary Smith

(57) ABSTRACT

A method for determining road bank angle in a vehicle includes a lateral acceleration sensor (22) that generates a lateral acceleration signal. A yaw rate sensor (18) generates a yaw rate signal. A roll rate sensor (23) generates a yaw rate signal. A controller (14) coupled to the sensors calculates a first roll angle signal in response to the roll rate signal and calculates a second roll angle signal corresponding to a suspension reference roll angle in response to the lateral acceleration signal. The controller calculates a bank angle signal in response to the lateral acceleration signal, the yaw rate signal, the steering wheel signal and the speed signal. The controller sums the first roll angle signal, the second roll angle signal and the bank angle signal to obtain a final roll angle estimate.

15 Claims, 2 Drawing Sheets

METHOD FOR DETERMINING THE ROLL ANGLE OF A VEHICLE USING AN ESTIMATION OF ROAD BANK ANGLE

TECHNICAL FIELD

The present invention relates generally to a method for determining the roll angle of a moving vehicle. More particularly, the present invention relates to a method for detecting the roll angle under dynamic lateral operating conditions for use in a motor vehicle having a yaw or rollover control system.

BACKGROUND

Automotive vehicles with braking systems which respond to vehicle conditions as well as driver input have been produced. For example, when a particular yaw rate is desired, as indicated by a driver's steering wheel operation, if the vehicle is not producing an adequate yaw rate, the braking system of the vehicle may compensate by altering a particular wheel's speed. This control is dependent on accurate measurement of several vehicle operating conditions. It has been observed that error can be introduced in the control system if the vehicle is operating on a banked surface. Therefore, it is desirable to determine the bias in the various operating condition signals introduced by operating on a banked surface.

U.S. Pat. No. 5,446,658 ('658) addresses the problem of estimating bank angles of a road surface. However, under various operating conditions, the system described in '658 patent does not have the ability to calculate the road surface bank angle under dynamic lateral operating conditions. Specifically, if the yaw rate for the vehicle changes by more than a predetermined threshold, the previously determined bank angle is assumed as the current bank angle. Of course, it is quite possible for a vehicle to undergo extreme bank angle variation during the period that the yaw rate is not within a predetermined threshold.

U.S. Pat. No. 6,073,065 provides a method for determining a bank angle experienced by a motor vehicle that is robust to dynamic lateral vehicle operations. However, the methodology reaches its limitation during high frequency maneuvers with simultaneous road bank variation. The estimation during dynamic maneuvers may experience some instantaneous errors.

A paper presented by Y. Fukada entitled "Estimation of Vehicle Slip-Angle With Combination Method of Model Observer and Direct Integration", presented at the International Symposium on Advance Vehicle Control in September 1998, addresses the estimation of road bank angle with vehicle slip angle. In this paper, the difference between lateral force measured with a lateral accelerometer and the tire model estimated lateral force is used to obtain the road bank angle. However, its accuracy is contingent on the accuracy of the estimated lateral tire force, which, in turn depends on the accuracy of the road surfaces and lateral velocity. In this approach, the lateral velocity in road bank angle estimation is believed to be, at best, a convoluted process. Also, the accuracy and robustness of such a calculation is suspect.

In roll sensing systems, three accelerometers and three angular rate sensors have been used. Together the sensors track the position and attitude of the vehicle. One problem with such systems is that the output of the sensors is susceptible to cumulative drift errors. Some gyroscopic sensors are available to minimize drift but are typically unsuitable and too expensive for automotive applications. U.S. Pat. Nos. 6,038,495 and 6,212,455 use automotive grade sensors to determine rollover of the vehicle. Such systems take advantage of short-term integration and/or an inclinometer for bias correction. However, such systems are not capable of detecting sustained road surfaces such as the road bank during a turn. Under bank conditions, the frame of reference changes and therefore the output does not provide a reliable vehicle roll attitude. The '495 patent, for example, uses integration with a high pass filter while the '455 patent uses a lateral accelerometer/inclinometer to provide long term offset compensation. During bank turn conditions, the steady state roll is no longer zero and the lateral acceleration is not a good indication of the vehicle roll angle. Therefore, neither of these approaches provides robust roll angle estimation for road disturbances such as road bank angles, and in particular, sustained road bank angles.

It would be desirable to determine roll angle under a variety of conditions including a bank angle being experienced by the vehicle.

SUMMARY OF THE INVENTION

The present invention provides a robust method and apparatus for determining the roll angle of a vehicle that takes into consideration the suspension roll, the road bank angle experienced by a motor vehicle, as well as sensor measurement drift errors. The method comprises providing a lateral acceleration signal corresponding to a lateral acceleration of the vehicle, providing a yaw rate signal corresponding to a yaw rate of the vehicle, providing a steering wheel signal responsive to a sensed steering wheel angle of the vehicle, providing a speed signal corresponding to a vehicle speed, calculating a first bank angle estimate dependent on the lateral acceleration signal, the yaw rate signal, the steering wheel signal and the speed signal, calculating a suspension reference roll angle in response to said lateral acceleration signal, calculating a conservative bank angle estimate signal in response to the first bank angle estimate and the suspension roll reference angle.

In a further aspect of the invention where the total vehicle roll/bank angle is estimated, a system for controlling a vehicle includes a lateral acceleration sensor generating a lateral acceleration signal corresponding to a lateral acceleration of the vehicle, a roll rate sensor generating a roll rate signal corresponding to a roll rate of the vehicle, a yaw rate sensor generating a yaw rate signal corresponding to a yaw rate of the vehicle, a steering wheel angle sensor generating a steering wheel angle signal corresponding to a steering wheel angle of the vehicle, a speed sensor generating a speed signal corresponding to the longitudinal speed of the vehicle. A controller is coupled to the lateral acceleration sensor, the yaw rate sensor, the steering wheel angle sensor and the speed sensor. The controller calculates a first roll angle signal in response to the roll rate signal and calculates a second roll angle signal corresponding to a suspension reference roll angle in response to the lateral acceleration signal. The controller calculates a bank angle signal in response to the lateral acceleration signal, the yaw rate signal, the steering wheel signal and the speed signal. The controller sums the first roll angle signal, the second roll angle signal and the bank angle signal to obtain a final roll angle estimate.

One advantage of the present invention is that drift of the measured signal is reduced so that the present invention is more accurate in relatively long banked turns.

DESCRIPTION OF THE PREFERRED EMBODIMENT

A method according to the present invention is intended for use with yaw control systems or rollover control systems which are typically implemented with electronically controlled hydraulically actuated or electrically actuated braking systems in automotive vehicles, however, the invention could easily be adapted for use in yaw control systems or rollover control systems on other motor vehicles, such as watercraft and aircraft as well as on other vehicle systems, such as active tilt or active suspension where it would be desirable to know the underlying road bank angle.

Figure 1:
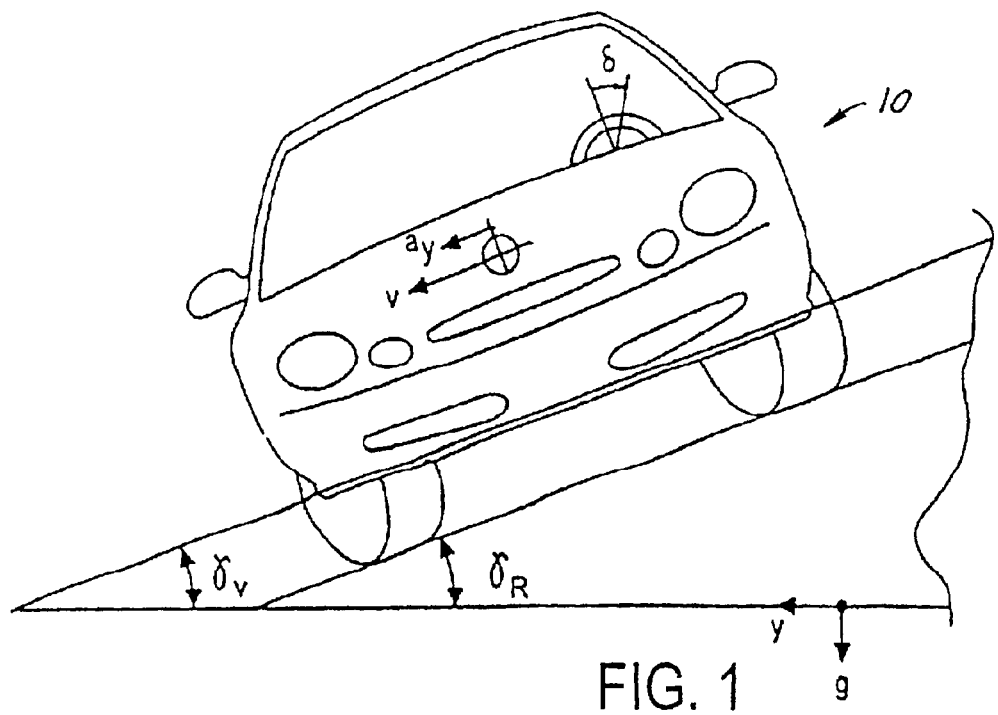
FIG. 1 is a front view of a motor vehicle illustrating various operating parameters of a vehicle experiencing a turning maneuver on a banked road surface.
Figure 2:
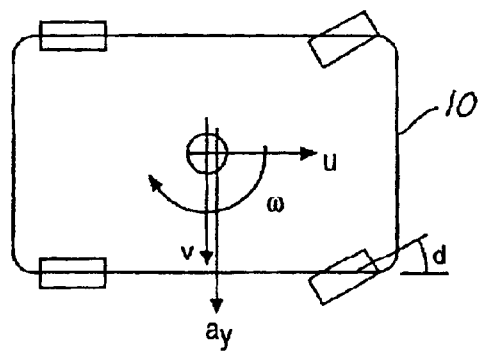
FIG. 2 is a top view of a motor vehicle illustrating various operating parameters of a vehicle experiencing a turning maneuver on a banked road surface.

Referring now to FIGS. 1 and 2, various operating parameters and variables used by the present invention are illustrated as they relate to the application of the present invention to a ground based motor vehicle 10. Those skilled in the art will immediately recognize the basic physics represented by these illustrations, thereby make the adaptation to different types of vehicles easily within their reach. These parameters will be described in greater detail below.

Figure 3:
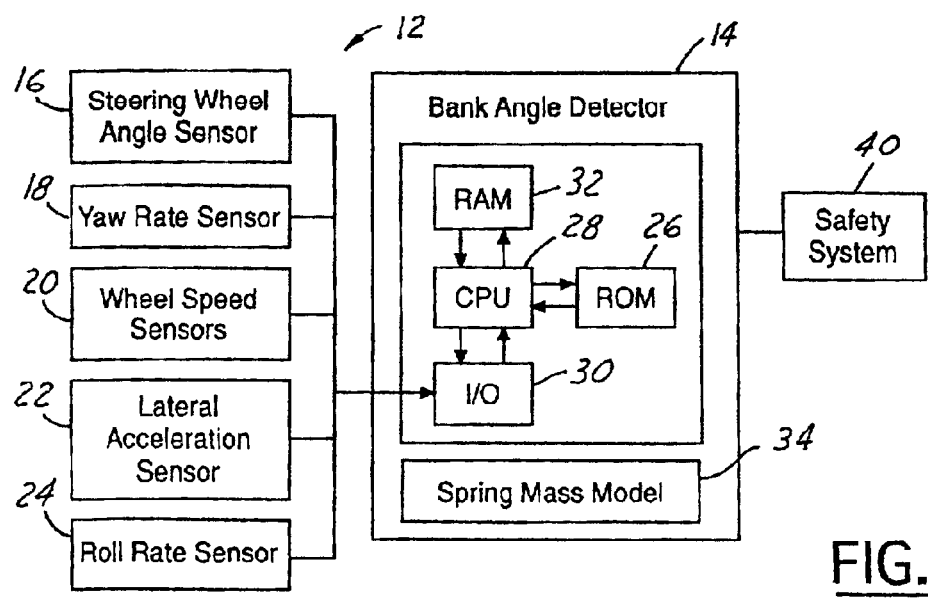
FIG. 3 is a block diagram showing a portion of a microprocessor interconnected to sensors and controlled devices which may be included in a system according to the present invention.

FIG. 3 illustrates the component parts of a system 12 in which the present invention has been implemented successfully. Accordingly, a controller 14 receives inputs from a steering wheel angle sensor 16, a yaw sensor 18, wheel speed sensors 20, a lateral acceleration sensor 22 and a roll rate sensor 24. Lateral acceleration, roll orientation and speed may be obtained using a global positioning system (GPS) Although not illustrated, other sensors and accelerometers could be employed in addition to, or as substitutes for those illustrated, depending upon the system being controlled and the available system sensor set while still making use of the present invention. As an example, the present invention could be carried out with equivalent operability and functionality using data to generate estimates of yaw rate and lateral acceleration if the cost, complexity or other considerations made it worthwhile to eliminate the actual sensors.

Controller 14 is preferably microprocessor based. Those skilled in the art will appreciate in view of this disclosure that a processor within the controller and its associated peripheral equipment could be structured according to several different architectures. In a preferred embodiment, however, the processor is configured so that a control program is sequentially read for each unit command from a read-only memory (ROM) 26, which stores preset control programs. Unit commands are executed by a central processing unit (CPU) 28. The processor integrally includes an input-output control circuit (I/O) 30 for exchanging data with external devices and a random access memory (RAM) 32 for temporarily holding data while the data are being processed.

Controller 14 may also be programmed with a spring mass model 34, which corresponds to the suspension of the automotive vehicle. The spring mass model varies for each type of vehicle and suspension configuration. The model 34 generates a predetermined output based upon the sensed conditions such as lateral acceleration.

Controller 14 IS coupled to a safety system 40. As previously noted, an exemplary application of the present invention includes a braking system having active yaw control or rollover control capability. For instance, a vehicle equipped with an active yaw control capable electronically controlled hydraulic braking system would include a hydraulic control unit operatively connected to brake actuators in cooperation with wheel and tire assemblies. The hydraulic control unit and brake actuators may be constructed in a known manner such as that commonly employed on Ford Motor vehicles equipped with ABS brakes in use today.

Those skilled in the art will appreciate in view of this disclosure that wheel speed sensors 20 could comprise any of a variety of devices or systems employed in automotive vehicles for determining individual wheel speeds as well as a longitudinal velocity of the vehicle. One type of automotive speed sensor suitable for use with the present invention comprises a speed module for receiving input from multiple wheel speed sensors adapted to indicate the speed of the individual wheels. The speed module derives a longitudinal vehicle speed signal by combining the signals from the individual wheel speed sensors. One such type of speed signal module is embodied in brake control modules presently used in Ford Motor Company vehicles. The individual wheel speeds are ascertained using pulse generators disposed at each wheel.

Roll rate sensor 24 may sense the roll condition of the vehicle based on sensing the height of one or more points on the vehicle relative to the road surface. Sensors that may be used to achieve this include a radar-based proximity sensor, a laser-based proximity sensor and a sonar-based proximity sensor. Roll rate sensor 24 may also sense the roll condition based on sensing the linear or rotational relative displacement or displacement velocity of one or more of the suspension chassis components which may include a linear height or travel sensor, a rotary height or travel sensor, a wheel speed sensor used to look for a change in velocity, a steering wheel position sensor, a steering wheel velocity sensor and a driver heading command input from an electronic component that may include steer by wire using a hand wheel or joy stick. The roll condition may also be sensed by sensing the force or torque associated with the loading condition of one or more suspension or chassis components including a pressure transducer in an act of suspension, a shock absorber sensor such as a load cell, a strain gauge, the steering system absolute or relative motor load, the steering system pressure of the hydraulic lines, a tire laterally force sensor or sensors, a longitudinal tire force sensor, a vertical tire force sensor or a tire sidewall torsion sensor.

The roll condition of the vehicle may also be established by one or more of the following translational or rotational positions, velocities or accelerations of the vehicle including a roll gyro, the roll rate sensor 24, the yaw rate sensor, the lateral acceleration sensor, a vertical acceleration sensor, a vehicle longitudinal acceleration sensor, lateral or vertical speed sensor including a wheel-based speed sensor, a radar-based speed sensor, a sonar-based speed sensor, a laser-based speed sensor or an optical-based speed sensor.

Referring back now to FIGS. 1 and 2, the present invention determines an estimate of the vehicle roll angle, $\gamma_v$, which represents the sum of the vehicle tilt, due to suspension compliance, and a road bank angle, $\gamma_R$. This is accomplished by using three separately derived roll angle estimates. One roll angle estimate is based on the roll rate signal, a second is based on the lateral acceleration and the spring mass model, and one based on a conservative road bank estimate. By compensating the roll angle estimate in this manner, the bank angle can be accurately estimated for most dynamic lateral conditions a vehicle will encounter in a controlled situation, improving the overall yaw control performance in common dynamic lateral events.

Figure 4:
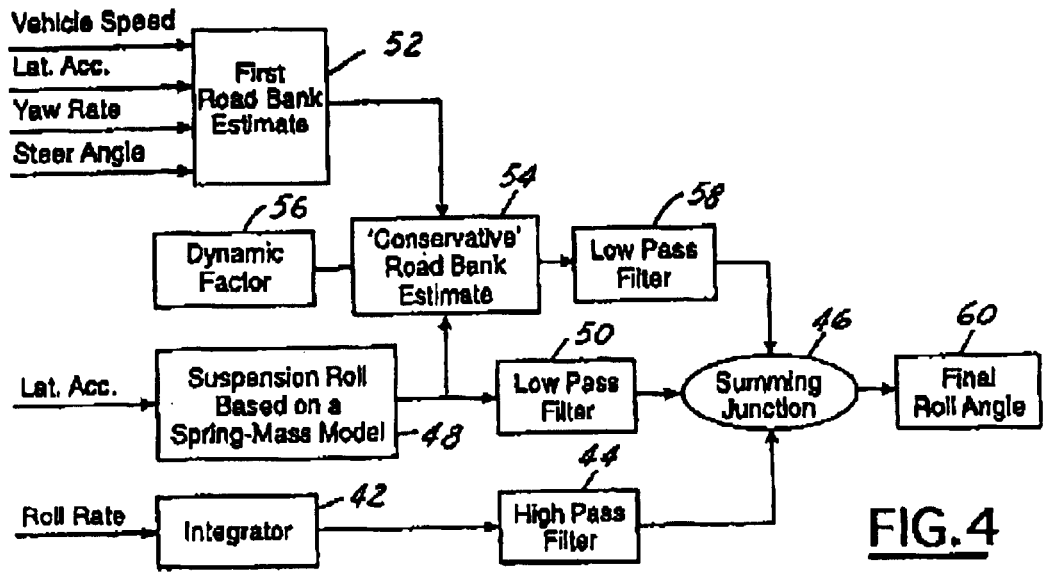
FIG. 4 is a block diagrammatic view of the final roll angle determination according to the present invention.

Referring now to FIG. 4, a model for determining the roll angle according to the present invention is shown. The model is preferably programmed within controller 14. Controller 14, as mentioned above, determines three angles. The first angle is based upon the output of roll rate sensor 24 as explained above. The output of roll rate sensor 24 is coupled to an integrator 42. The output of integrator 42 in turn is coupled to a high pass filter 44. By combining integrator 42 with high pass filter 44 drift issues are eliminated. By determining a roll angle based upon the roll rate, a high frequency vehicle roll angle is determined. The integration of the roll rate signal determines the roll angle. The output of the high pass filter 44 is coupled to a summing junction 46.

The output of the lateral acceleration sensor 22 of FIG. 3 may also be used to determine a roll angle. The roll angle is based upon the spring mass model 34 shown in FIG. 3 together with the lateral acceleration signal. The output of the suspension roll angle is coupled through a low pass filter 50. Preferably, the spring mass model has a single degree of freedom with the external lateral force excitation. The model provides the roll angle due to the difference in suspension deflection along the axial or lateral direction of the vehicle when subjected to a lateral force. The lateral force may be induced from either turning maneuvers or from a gravity component due to the road bank. The roll angle determined is further fed into a low pass filter to obtain a low frequency component of vehicle roll angle. The roll angle determined by the spring and mass model is filtered by low pass filter 50 and the resulting low frequency suspension roll angle is coupled to summing junction 46.

In block 52 a first road bank angle estimate is obtained using the vehicle speed lateral acceleration sensor, yaw rate sensor, and steering wheel angle sensor shown in FIG. 3. The first road bank estimate is obtained using the teachings described below in FIG. 5 or in U.S. application Ser. No. 09/761,157, the disclosure of which is incorporated by reference herein. The first road bank angle estimate is coupled with the output from the spring mass model in block 48 to obtain a conservative road bank estimate in block 54. The "conservative" road bank estimate is referred to as conservative if the absolute value is smaller than that of the true road bank angle. That is, a road bank estimate is conservative if the estimate is closer to a flat or horizontal surface than the road's actual elevation. The first road bank angle estimate is reduced by the amount of the absolute value of the suspension roll if its absolute value has the same sign as the first road bank angle estimate. Further, a dynamic factor block 56 may also be factored into the conservative road bank estimate. The dynamic factor block 56 will be further described below.

The output of the conservative road bank estimate block 54 is preferably low pass filtered in block 58, which in turn is summed at summing junction 46.

Summing junction 46 sums the road bank estimate, the spring mass model roll angle, and the roll angle determined from the roll rate sensor to form a final roll angle in block 60. Preferably, a simple addition of all the signals is performed. However, weighted sums could be used.

Figure 5:
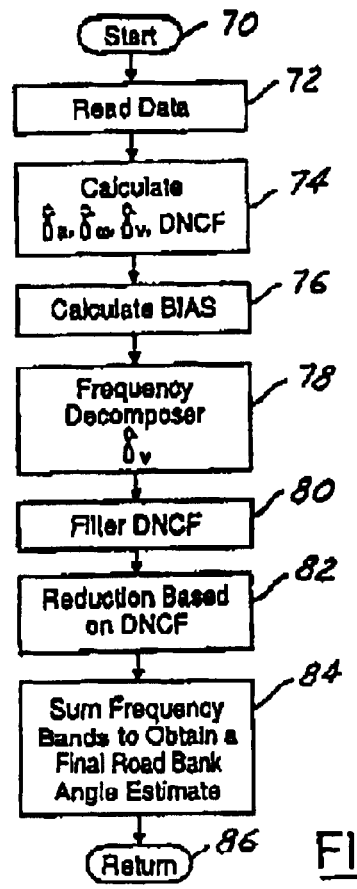
FIG. 5 is a logic flow block diagram in accordance with the present invention.

Referring now to FIG. 5, the first road bank estimate block 52 is described in further detail. Using equations of motion for a rigid body the following relationship can be obtained:

$$a_y = u\omega + \dot{v} - g\sin(\gamma_v) \quad (1)$$

where:

$a_y$=lateral acceleration measured by an accelerometer on the vehicle;

u=longitudinal velocity of vehicle;

$\omega$=yaw rate;

$\dot{v}$=time derivative of the lateral velocity;

g=gravitational constant; and $\gamma_v$=vehicle bank angle.

From this, if we assume that the time derivative of the lateral velocity, $\dot{v}$, is approximately zero, we can set $$\sin\hat{\gamma}_v = \frac{a_y - u\omega}{g} \quad (2)$$

We note that there will be error, primarily due to leaving $\dot{v}$ out, however, the vehicle bank angle estimate, $\hat{\gamma}_v$ will be valid when $\dot{v}$ would otherwise be zero, e.g., lateral dynamics are steady state. This is what others have done, particularly the '658 reference.

To provide greater accuracy in determining a bank angle estimate when the lateral dynamics are not steady state, the bias introduced by this assumption must be considered.

At block 70 the processor starts the illustrated logic flow block diagram when the operator keys on the vehicle ignition. The processor then moves to block 72 where parameters and operating conditions of the vehicle are updated from various sensors, where the various sensors are read and their data input to the processor. If this is the first time through the algorithm all of the variables are initialized with predetermined values. The processor then steps to block 74 where three unique estimates of the vehicle bank angle $\hat{\gamma}_\alpha$, $\hat{\gamma}_\omega$ and $\hat{\gamma}_v$, are determined.

The first bank angle estimate, $\hat{\gamma}_\alpha$, is determined using measured or estimated lateral acceleration data according to the following relationship:

$$\hat{\gamma}_\alpha = A_1^{-1}(a_y - A_2\delta) \quad (3)$$

where:

$\hat{\gamma}_\alpha$=a bank angle estimate based on measured lateral acceleration;

$A_1$=a transfer function relating bank angle to vehicle lateral acceleration, where:

$$A_1 = \frac{-gL}{(L+Ku^2)} \tag{4}$$

$A_2$=a transfer function relating steering wheel angle to vehicle lateral acceleration, where:

$$A_2 = \frac{Gu^2}{(L+Ku^2)} = \tag{5}$$

G=steering ratio relating actual tire angle, $\alpha$, to steering wheel angle, $\delta$;

K=calibrated coefficient related to specific vehicle handling characteristics; and $\delta$=steering wheel angle.

The second bank angle estimate, $\hat{\gamma}_\omega$, is determined using measured or estimated yaw rate data according to the following relationship:

$$\hat{\gamma}_\omega = B_1^{-1}(\omega - B_2 \delta) \tag{6}$$

where:

$\hat{\gamma}_\omega$=bank angle estimate based on measured yaw rate;

$B_1$=a transfer function relating bank angle to vehicle yaw rate, where:

$$B_1 = \frac{gKu}{(L+Ku^2)} \tag{7}$$

$B_2$=a transfer function relating steering wheel angle to vehicle yaw rate, where:

$$B_2 = \frac{Gu}{(L+Ku^2)} \tag{8}$$

The third bank angle estimate, $\hat{\gamma}_v$ is determined using measured or estimated lateral acceleration and yaw rate data in a rearranged version of Equation (2) from above, as follows:

$$\hat{\gamma}_v = \sin^{-1}\left[\frac{1}{g}(a_y - u\omega)\right] \tag{9}$$

where:

$\hat{\gamma}_v$=vehicle bank angle estimate based on measured lateral acceleration and yaw rate data based on the simplified equation of motion.

Once the processor has the three estimates from above, it proceeds to block 76 and calculates the bank angle bias due to the lateral dynamics. The processor determines the bias by the following equation:

$$\text{bias} = |DNCF| + \left|\frac{d\hat{\gamma}_v}{dt}\right| \tag{10}$$

where:

DNCF=a dynamics compensation factor, which is generally a function of the three estimates and the longitudinal velocity, which may take the following form:

$$DNCF = A_1(\hat{\gamma}_\alpha - \hat{\gamma}_v) + (\hat{\gamma}_\omega - \hat{\gamma}_v), \text{ and} \tag{11}$$

$\frac{d\hat{\gamma}_v}{dt}$ = a numerically estimated time rate of change of the third bank angle estimate.

The processor then proceeds to block 78 where bias is used to account for the error introduced from simplifying Equation (1) into Equation (2). Together, DNCF and $$\frac{d\hat{\gamma}_v}{dt} \tag{12}$$

account for how much change in lateral dynamics, or $\dot{v}$, the vehicle may be experiencing.

In step 78, the frequencies of the third bank angle estimate are decomposed into a plurality of frequency bands. The number of bands depends on many things including the desired accuracy and system to which it is applied. In one constructed embodiment, three frequency bands were used.

In step 80, the DNCF is filtered to obtain a frequency band dynamic compensation factor corresponding to each of the frequency bands of the third bank angle determined in step 78. The decomposed frequency bank angles of each band are subject to a reduction in step 82 based on a multiplicative factor between zero and 1 that is a function of the dynamic compensation factor. The multiplicative factor in each band is chosen to remove bias in that band. The filtering of step 80 may, for example, be low pass filtering selected for the frequency ranges of decomposition performed in step 78. The step 82 may further comprise the determination and use of the rate of change for the third bank angle estimate, $\theta_{84}$.

In step 84, the frequency band reductions of step 82 are summed together in step 84 to form a final road bank angle estimate. By performing a reduction based on the dynamic compensation factor, a more accurate estimation of road bank angle may be determined. Such a determination is believed to be extremely useful in maneuvers even on snow and ice while avoiding false or nuisance activation on a banked road.

The processor then proceeds to block 84 and outputs the final bank angle estimate to the controller 14 so that adjustments can be made in the control calculations. Finally, the processor returns through block 86 to block 72, where it will repeat the bank angle estimation process until the vehicle ignition is turned off.

Various modifications will no doubt occur to those skilled in the arts to which this invention pertains. For example, the particular sensors used in conjunction with the disclosed method may be varied from those herein, as there are numerous possible methods for measuring or estimating the longitudinal velocity, yaw rate and lateral acceleration of a vehicle. Additionally, the method may be practiced with significant changes to the various transfer functions described above while remaining within the calculational and logic flow scheme described herein. Finally, it should be noted that if one desires an estimate of the lateral dynamics of Equation (1), it can be calculated using the final bank angle estimate. These and all other variations which, basically, rely on the teachings to which this disclosure has advanced the art, are properly considered within the scope of this invention as defined by the appended claims.

While particular embodiments of the invention have been shown and described, numerous alternate embodiments will occur to those skilled in the art. Accordingly, it is intended that the invention be limited only in terms of the appended claims.

What is claimed is:

1. A system for controlling a vehicle comprising:
a lateral acceleration sensor generating a lateral acceleration signal corresponding to a lateral acceleration of the vehicle;
a yaw rate sensor generating a yaw rate signal corresponding to a yaw rate of the vehicle;
a steering wheel angle sensor generating a steering wheel angle signal corresponding to a steering wheel angle of the vehicle;
a speed sensor generating a speed signal corresponding to the longitudinal speed of the vehicle;
a roll rate sensor generating a roll rate signal; and
a controller coupled to said lateral acceleration sensor and said yaw rate sensor, said steering wheel angle sensor, said roll rate sensor and said speed sensor, said controller calculating a first roll angle signal in response to said roll rate signal, said controller calculating a second roll angle signal corresponding to a suspension reference roll angle in response to said lateral acceleration signal and a spring mass model, said controller calculating a first bank angle estimate dependent on said lateral acceleration signal, calculating a second bank angle estimate dependent on said yaw rate signal, calculating a third bank angle estimate dependent on both said lateral acceleration signal and said yaw rate signal, calculating a dynamic compensation factor as a function of said first bank angle estimate, said second bank angle estimate and said third bank angle estimate, decomposing the third bank angle estimate into a plurality of third bank angle frequency bands, reducing each of the plurality of third bank angle frequency bands in response to a multiplicative factor, said multiplicative factor being a function of said dynamic compensation factor to obtain a plurality of reduced third bank angles, and calculating a final bank angle bias estimate based on a sum of the plurality of reduced third bank angles, and determining a final roll angle estimate from the first roll angle signal, the second roll angle signal and the final bank angle bias estimate.

2. A system as recited in claim 1 further comprising a high pass filter filtering the first roll angle signal prior to determining.

3. A system as recited in claim 2 further comprising a first low pass filter filtering the dynamic compensation factor.

4. A system as recited in claim 1 further comprising a bank angle filter filtering the bank angle signal.

5. A system as recited in claim 1 wherein said controller comprises an integrator integrating said roll rate signal to obtain the first roll angle signal.

6. A method of determining a roll angle comprising:
providing a lateral acceleration signal corresponding to a lateral acceleration of the vehicle;
providing a yaw rate signal corresponding to a yaw rate of the vehicle;
providing a steering wheel signal responsive to a sensed steering wheel angle of the vehicle;
providing a speed signal corresponding to a vehicle speed;
calculating a first bank angle estimate dependent on said lateral acceleration signal;
calculating a second bank angle estimate dependent on said yaw rate signal;
calculating a third bank angle estimate dependent on both said lateral acceleration signal and the yaw rate signal;
calculating a dynamic compensation factor as a function of said first bank angle estimate, said second bank angle estimate and said third bank angle estimate;
decomposing the third bank angle estimate into a plurality of third bank angle frequency bands;
reducing each of the plurality of third bank angle frequency bands in response to a multiplicative factor, said multiplicative factor being a function of said dynamic compensation factor to obtain a plurality of reduced third bank angles; and
calculating a final bank angle bias estimate based on a sum of the plurality of reduced third bank angles
calculating a suspension reference roll angle in response to said lateral acceleration signal and a spring mass model; and
calculating a conservative bank angle estimate signal in response to the final bank angle bias estimate and the suspension reference roll angle.

7. A method as recited in claim 6 further comprising providing a roll rate signal corresponding to the roll rate of the vehicle;
integrating the roll rate signal to obtain a roll-rate based roll angle; and
summing the conservative bank angle estimate, the suspension reference roll angle and the roll-rate based roll angle to obtain a final roll angle estimate.

8. A method as recited in claim 7 further comprising high pass filtering said roll-rate based roll angle prior to the summing.

9. A method as recited in claim 6 further comprising low pass filtering said conservative bank angle estimate signal.

10. The method according to claim 6, further comprising calculating said first bank angle estimate and said second bank angle estimate using said steering wheel angle signal and speed signal.

11. A method of determining a roll angle of a vehicle comprising:
providing a lateral acceleration signal corresponding to a lateral acceleration of the vehicle;
providing a yaw rate signal corresponding to a yaw rate of the vehicle;
providing a steering wheel signal responsive to a sensed steering wheel angle of the vehicle;
providing a speed signal corresponding to a vehicle speed;
providing a roll rate signal corresponding to the roll rate of the vehicle;
calculating a first roll angle signal in response to said roll rate signal;
calculating a second roll angle signal corresponding to a suspension reference roll angle in response to said lateral acceleration signal and a spring mass model;
calculating a first bank angle estimate dependent on said lateral acceleration signal;
calculating a second bank angle estimate dependent on said yaw rate signal;
calculating a third bank angle estimate dependent on both said lateral acceleration signal and the yaw rate signal;
calculating a dynamic compensation factor as a function of said first bank angle estimate, said second bank angle estimate and said third bank angle estimate;
decomposing the third bank angle estimate into a plurality of third bank angle frequency bands;
reducing each of the plurality of third bank angle frequency bands in response to a multiplicative factor, said multiplicative factor being a function of said dynamic compensation factor to obtain a plurality of reduced third bank angles; and determining a final bank angle bias estimate signal based on a sum of the plurality of reduced third bank angles; and determining a final roll angle estimate in response to the first roll angle signal, the second roll angle signal, and the final bank angle bias estimate.

12. A method as recited in claim 11 further comprising high pass filtering said first roll angle signal before the step of summing.

13. A method as recited in claim 12 further comprising low pass filtering said second roll angle signal before summing and low pass filtering the bank angle signal before determining the final roll angle estimate.

14. A method as recited in claim 11 further comprising low pass filtering said dynamic compensation factor before determining the final roll angle estimate.

15. A method as recited in claim 11 wherein calculating a first roll angle signal comprises integrating the roll rate signal to obtain the roll-rate based roll angle.

* * * * *